UNITED STATES PATENT OFFICE.

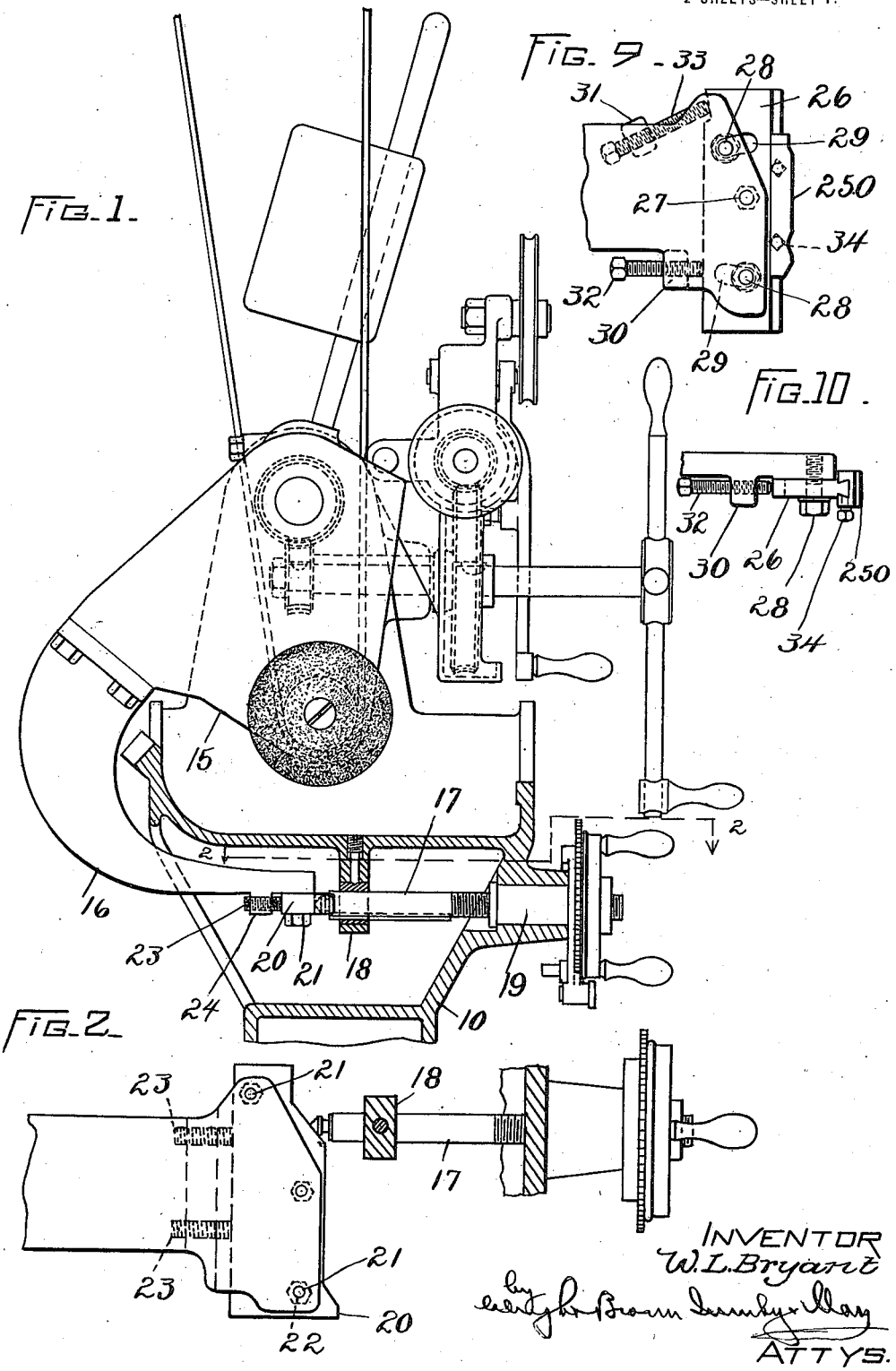

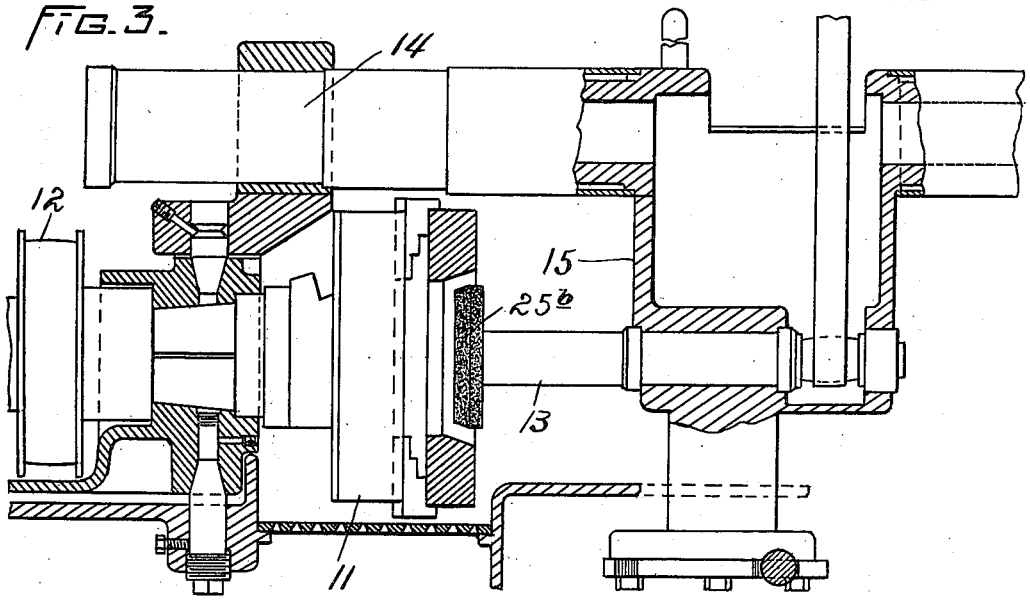
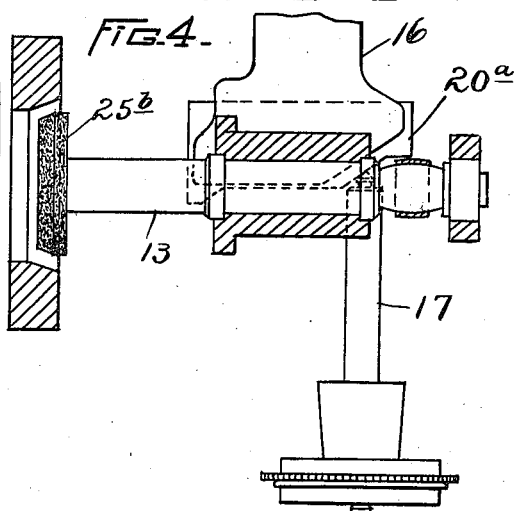
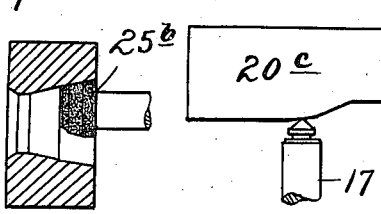
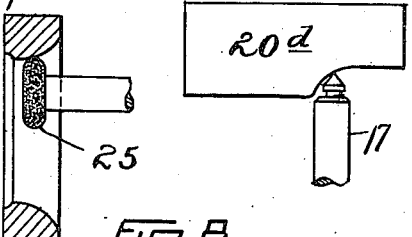
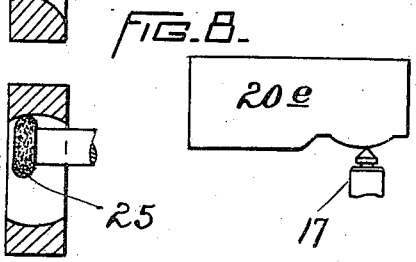
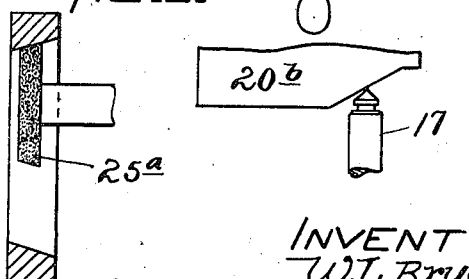

WILLIAM LE ROY BRYANT, OF SPRINGFIELD, VERMONT.

GRINDING-MACHINE.

1,300,923.          Specification of Letters Patent.     Patented Apr. 15, 1919.

Application filed December 30, 1916. Serial No. 139,871.

*To all whom it may concern:*

Be it known that I, WILLIAM LE ROY BRYANT, a citizen of the United States, residing at Springfield, in the county of Windsor and State of Vermont, have invented new and useful Improvements in Grinding-Machines, of which the following is a specification.

This invention has relation to machines for external or internal grinding, and has for its object to provide such machines with mechanism by which it is possible to grind surfaces which are tapering or curvilinear. More especially the invention constitutes an improvement upon the machine shown in my Letters Patent No. 1,051,483, dated January 28, 1913, and consists of certain features of construction and arrangements of parts and instrumentalities, all as illustrated upon the accompanying drawings, described in the following specification and particularized in the appended claims.

On the accompanying drawings,—

Figure 1 represents in vertical transverse section a grinding machine embodying my improvements.

Fig. 2 represents a horizontal section on the line 2—2 of Fig. 1.

Fig. 3 represents a substantially vertical longitudinal section taken through the axis of the tool carrier.

Figs. 4 to 8 inclusive illustrate different forms of grinding wheels and templets for use in grinding the respective pieces of work illustrated.

Figs. 9 and 10 illustrate another form of templet holder.

It is unnecessary to describe in detail the general features of construction of the machine illustrated by said drawings, since a full description thereof is given in the Letters Patent hereinbefore referred to. It will suffice to state that the machine is equipped with a bed 10, a rotary work holder or carrier 11 rotated by a pulley 12, a grinder spindle 13, and a tool carrier consisting of two trunnions 14 slidably and rotatably journaled in bearings on the bed, and having the lateral hollow arm or offset portion 15 in which the grinder spindle is journaled. The tool carrier in the form of machine shown is fed automatically lengthwise, by means not shown, and is movable about its axis to feed the grinding tool transversely of the work axis.

In the particular machine which I have used to exemplify the invention, the work holder is provided with a chuck for holding detached pieces to be externally or internally ground, but of course the machine may be rigged for holding and rotating bar work on centers.

The transverse control and feed of the grinding wheel is effected by an arm or extension 16 which curves forwardly into a hollow portion of the bed, and a bar 17 arranged transversely of the bed, and splined in a stationary bearing 18. The front end of the bar is threaded and is engaged by a sleeve nut 19, journaled in a bearing in the bed, the rotation of which automatically or by hand moves the bar 17 in one direction or the other, all as explained in said Letters Patent.

In accordance with the present invention, the end of the tool carrier arm or extension 16 is laterally extended and adapted for the reception of any one of a number of interchangeable templets, such as at 20 in Fig. 2. In any case, the templet is secured by screws or fastenings 21 (passed through apertures 22) to the under face of the horizontal portion of said arm, and its rear edge bears against abutment screws 23 passed adjustably through a rib 24 depending from said arm. The forward edge or face of the templet is in the horizontal plane of the bar 17, and forms a guide against which the pointed end of said bar bears. The operative face of the templet is either curvilinear, rectilinear, shouldered or otherwise according to the desired conformation of the finished work. With the templet shown in Fig. 2 the grinding wheel will travel first along a straight line parallel to the axis of the work, then along a line at an obtuse angle thereto, then along a line parallel to the axis of the work, and then along a line at an obtuse angle. Hence the work will be ground with two portions of different diameters and with two tapering portions.

In Figs. 4 to 8 inclusive, the templets 20$^a$, 20$^b$, 20$^c$, 20$^d$, 20$^e$, are all interchangeable, and are used for internally grinding the several pieces of work illustrated in section. It should be noted that in each case the shape of the operative face of the grinder is the reverse of the ground face or surface of the work, since the tool extends into the work and moves substantially radially thereof.

Where parts are to be ground with a surface which is curved convexly or concavely longitudinally of the axis thereof, I preferably provide a grinding wheel 25, such as shown in Figs. 7 and 8, having a convex periphery. But, where the work is to be tapered, or to be ground both straight or tapered I prefer to provide the grinding wheel 25ᵃ with a tapered periphery as in Fig. 5 for the one case, and with a combined cylindrical and tapering or frusto-conical periphery as at 25ᵇ in Figs. 3, 4 and 6. The taper of the grinding wheel should correspond to the taper of the finished work and also to the inclined portions of the particular templet employed, so that in straight grinding, as when the tool carrier is being guided by that portion of the templet parallel to the work axis, the cylindrical portion of the grinding wheel engages the work, and, when the tool carrier is being guided by an inclined portion of the templet, the tapering or frusto-conical portion of the wheel operates upon the work.

It has been customary heretofore in taper grinding to adjust the work holder, so that its axis lies at an angle to the path of travel of the grinding tool, and this of course required a nice adjustment of the machine for the particular parts being ground. By means of the improvements herein described, a templet once made serves for use in grinding an indefinite number of duplicate parts, and does away with the necessity of constructing the machine so as to afford a bodily torsional adjustment of either the work carrier or the grinding wheel or the guides therefor, with the liability of error due to such adjustment.

In Figs. 9 and 10, I have illustrated the templet 250 as being mounted in a holder 26 adjustably secured in the tool carrier arm or extension. In this case, the holder is pivoted upon the pin 27 and is rigidly held at the desired angle by bolts 28 passing through curved slots 29 in said holder into holes in the end of the arm. Stops 30, 31 are located on the arm, and through these stops, if desired, may be passed abutment screws 32, 33, to engage the ends of the holder. The holder has at its front edge an undercut tongue to engage a complemental groove in the templet. The templet is held against movement by a set screw 34. The templet may be removed without affecting the adjustment of the holder, the latter being adjusted usually for only straight taper grinding.

For the purpose of creating a distinction between a templet having an operative face which is parallel throughout to the path of movement of the tool carrier, and one such as shown on the drawings and having a face which is curved or inclined, or shouldered, I may refer to the latter generically as "irregular", and the term may thus be undertsood, in the absence of a more descriptive generic term.

Having thus explained the nature of my said invention and described a way of making and using the same, although without attempting to set forth all of the forms in which it may be made or all of the modes of its use, what I claim is:

1. A grinding machine, comprising a rotary work holder, a rotary grinding wheel arranged to move bodily transversely of the work axis about an axis parallel to the axis of the grinding wheel, means for effecting a relative longitudinal feed of the work holder and grinding wheel, a removable "irregular" templet arranged longitudinally of said axes and having an elongated operative surface of which a portion is out of parallelism with the axis of the work, and an abutment engaged with said operative surface of the templet, one of the last two mentioned elements being stationary and the other being movable along the same together with the said longitudinally movable element of the first two mentioned elements, to swing said grinding wheel bodily on its axis of movement.

2. A grinding machine, comprising a rotary work holder, a rotary grinding wheel arranged to move transversely of the work axis about an axis parallel to the axis of the grinding wheel, means for effecting a relative longitudinal feed of the work holder and grinding wheel, a removable "irregular" templet arranged longitudinally of said axes and having a straight portion and an inclined portion, and an abutment engaged with said operative surface of the templet, one of the last two mentioned elements being stationary and the other being movable longitudinally of said axes together with the said longitudinally movable element of the first two mentioned elements, said grinding wheel having a cylindrical and a frusto-conical periphery, having a definite relation to the irregular templet.

3. A grinding machine, comprising a rotary work holder, a rotary grinding wheel hung to move bodily about an axis parallel to its axis of rotation and transversely in relation to the work axis, means for feeding the grinding wheel longitudinally of its axis, a templet holder in fixed relation to the grinding wheel and movable therewith, an elongated templet removably attached to said holder, and a stationary abutment with which said templet is in sliding engagement.

In testimony whereof I have affixed my signature.

WILLIAM Le ROY BRYANT.